INVENTORS
LANGDON H. BERRYMAN
PIERRE L. GOUPILLAUD
KENNETH H. WATERS
BY *Floyd Trimble*
ATTORNEY Nov. 21, 1961   L. H. BERRYMAN ET AL   3,009,527
METHOD AND APPARATUS FOR SEISMIC TRACE SYNTHESIS
Filed Oct. 27, 1958   3 Sheets-Sheet 2

INVENTORS
LANGDON H. BERRYMAN
PIERRE L. GOUPILLAUD
KENNETH H. WATERS
BY Floyd Trimble
ATTORNEY Nov. 21, 1961    L. H. BERRYMAN ET AL    3,009,527
METHOD AND APPARATUS FOR SEISMIC TRACE SYNTHESIS
Filed Oct. 27, 1958    3 Sheets-Sheet 3

INVENTORS
LANGDON H. BERRYMAN
PIERRE L. GOUPILLAUD
KENNETH H. WATERS
BY
Floyd Trimble
ATTORNEY

United States Patent Office 3,009,527
Patented Nov. 21, 1961

3,009,527
METHOD AND APPARATUS FOR SEISMIC TRACE SYNTHESIS
Langdon H. Berryman, Pierre L. Goupillaud, and Kenneth H. Waters, Ponca City, Okla., assignors to Continental Oil Company, Ponca City, Okla., a corporation of Delaware
Filed Oct. 27, 1958, Ser. No. 769,837
10 Claims. (Cl. 181—.5)

This invention relates to a novel method of and means for deriving the seismic trace corresponding to a known well velocity log. This seismic trace synthesis is useful in the field of geophysical prospecting and particularly in the interpretation of field seismograms.

The basic concept involved in seismic prospecting is well known: the changes in physical characteristics which accompany the changes in lithology within a stratified system of geological layers cause the reflection of elastic waves propagating through the system. Accordingly, if an elastic disturbance is created near the surface, for example by the explosion of a dynamite charge, and the elastic energy reaching another point on the surface is detected and measured as a function of the time elapsed after the explosion, a substantial portion of this energy will represent the successive reflections of the primary disturbance as it encounters the various interfaces of the layered system. The record thus obtained will contain the information required to determine the depth distribution of these interfaces.

While this concept is simple, practical experience has shown that many complicating factors contribute to a greatly increased complexity of the field records, rendering their interpretation very difficult and hazardous. One of these factors, possibly the most important one, is the presence of a very large number of interfaces and the resulting multiple reverberations of the elastic energy between them. Another relates to the fact that the duration of the elastic disturbance generated at the source is frequently longer than the travel time between successive interfaces and that consequently individual reflections interfere and overlap and generally are not easily identifiable.

Various methods have been proposed in the past for overcoming the difficulties encountered in the interpretation of these field seismograms. For instance, it has been suggested to scan a well velocity log and generate an electrical pulse of predetermined shape and adjustable amplitude each time the log presents a velocity change representative of a change of geologic formation. Such a method is disclosed at length by R. A. Peterson et al. in the July 1955 issue of "Geophysics," p. 516–538. However, this method has various shortcomings. First, it does not take into account the energy reverberated between interfaces. Second, it is not suited to indicate the effect on a seismogram of a zone in which the velocity changes rather rapidly but still only gradually, the so-called "transition zone."

It has also been proposed to produce a synthetic seismic trace by means of an analog model. This approach appears more appealing if the model may be realized with sufficient accuracy at acceptable cost. The use of a tube with adjustable cylindrical restrictions movable therein and providing for creating sectional variations of the inside of the tube (air column) corresponding to the velocity changes in the well was suggested several years ago. However, in view of the low velocity of sound in air, this method is not practical. A similar system has been disclosed recently in F. A. Angona's U.S. Patent No. 2,834,422 in which the analog model consists of a metal rod of variable cross-section area. In this case, the difficulty resides in the accurate machining of the rod, because a small diameter change corresponds to a substantial velocity change (in the inventor's own example, a .1245 inch diameter change corresponded to 12.540 feet/second velocity change, i.e., .01 inch corresponded to 1,000 '/sec.). It will be apparent that machining to such tolerance is difficult and expensive.

The present invention contemplates the use of an analog plastic material model, preferably of uniform cross-section, and means for controlling the acoustic velocity characteristic along the model to stimulate a known well velocity log. Velocity variations along the model are preferably obtained by varying the temperature along the length of the model. Elastic pulses are applied to one end of the model and are reflected and refracted by the interfaces between the areas of different velocity in the model, such that the elastic pulses returning to the same end of the model are representative of a seismic signal having unusual similarity to a seismic signal which would be obtained under actual operating conditions. The resulting synthetic seismic signal is extremely useful in interpreting field records. Broadly stated, the invention may be defined as a method of producing a synthetic seismic signal corresponding to a known well velocity log which comprises the steps of establishing a series of areas having different acoustic velocity characteristics along an elongated plastic member which is similar to the velocity profile along said log, applying an elastic pulse to one end of said plastic member, and detecting the reflected elastic pulses appearing at the same end of said plastic member. A velocity profile is the plot of the variations in velocity versus the length along the plastic rod, or in the case of a well bore, it is the plot of the variations in velocity versus depth of the well bore.

An important object of our invention is to provide a method for making a synthetic seismic trace by means of an analog model which is both simple and accurate and which overcomes the difficulties encountered in the prior art.

Another object of our invention is to provide a method of the above-mentioned character in which the velocity changes appearing on the velocity log can be easily duplicated in the model.

A further object of this invention is to provide an analog model for seismic trace synthesis which is simple to construct and which may be used with several different well velocity logs.

Another object of this invention is to provide apparatus for producing a synthetic seismic trace corresponding to a known well velocity log which may be economically manufactured and which will have a long service life.

Other objects and advantages of the invention will be evident from the following detailed description, when read in conjunctoin with the accompanying drawings which illustrate our invention.

Figure 1:
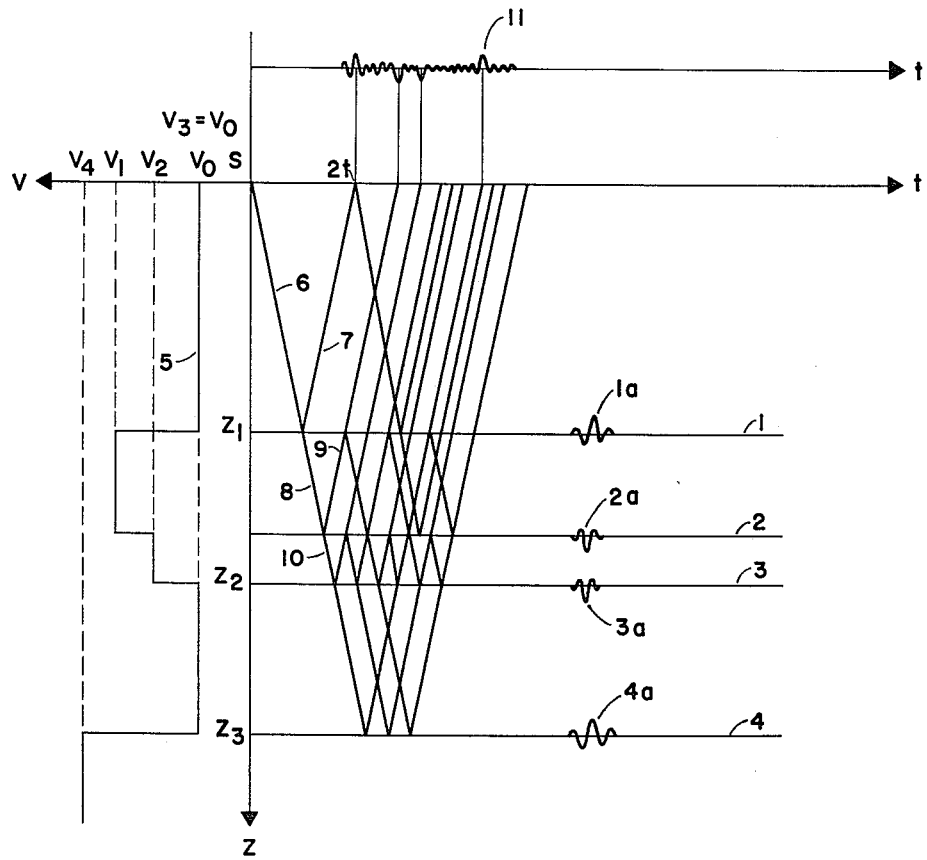
FIGURE 1 is a schematic illustration of the reflection process occurring when a plurality of interfaces are present.

Referring now to FIGURE 1, a vertcal line SZ is indicative of the depth at which interfaces 1, 2, 3, and 4 between different geological formations are located. The corresponding velocity changes occurring at these interfaces are indicated on the left side of line SZ where graph 5 is a plot of the velocity of acoustic wave versus depth along SZ. It may be seen that large velocity contrasts correspond to interfaces 1 and 4 and relatively smaller ones to interfaces 2 and 3. Each of these velocity contrasts are responsible for the reflection of a portion of the elastic wave energy impinging thereon, and the amplitude ratio of a reflected elastic wave to the incident parent wave is called the reflection coefficient of the interface. The magnitudes and signs of the reflection coefficients of interfaces 1, 2, 3, and 4 are schematically indicated by the size and shape of the elementary pulses 1a, 2a, etc., drawn at each interface level. These elementary pulses represent the reflected events when an elementary pulse of unit magnitude crosses the interface.

When an elementary seismic disturbance is generated at S, it travels downward and reaches interface 1 at time $T_1$ after the generation of said disturbance. This is indicated by line 6 plotted in a coordinate system SZ, ST in which the ordinate axis SZ represents depth while the abscissa axis ST represents the time elapsed after the generation of the disturbance. When the elementary pulse generated at S reaches interface 1, a portion of the energy is reflected and returns to S as indicated by line 7, where it is detected at time $$2T_1 = \frac{2Z_1}{V_0}$$

The remaining portion of the energy is transmitted through interface 1 and reaches interface 2, as indicated by line 8, where a partition of the energy occurs, as indicated by lines 9 and 10. The further partitions of energy occurring at each interface are similarly indicated by the successive branchings of the lines representing the depth at which various portions of the elastic energy are located at any time. These lines have not been numbered for a purpose of clarity of the drawing, since the latter is self-explanatory. The elementary events (pulses) reaching the surface at closely spaced time intervals which are generally shorter than the total duration of the elementary signal and the resulting seismic trace indicated at 11 are the result of the superposition of these elementary signals. It is easily verified that this resulting signal is very complex; and while it contains primary events indicative of the sequence of the geological interfaces, these are difficult to identify with accuracy, because they are partially hidden by the multiple reflected events.

Actually, the schematic representation of FIGURE 1 is far from being indicative of the complexity always present in field practice, as anyone who has seen velocity logs well knows. Consequently, in general, detailed interpretation of seismic traces is very difficult and successful only in rare areas. However, this detailed interpretation is often needed to discover oil traps, in particular those of the stratigraphic type. Consequently, it has been frequently suggested that the synthesis of a trace corresponding to a known well velocity log would be very helpful in the interpretation of seismic records obtained in the general area where the well is located.

Figure 2:
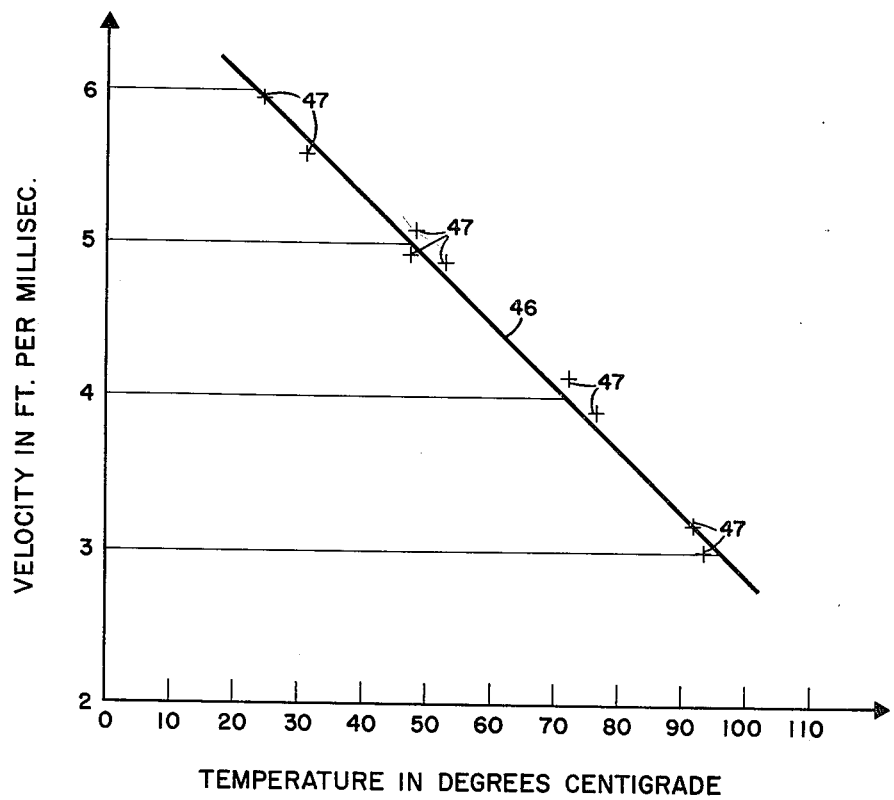
FIGURE 2 is a graph illustrating the linear relationship between the velocity of elastic waves in nylon and the temperature.

Our invention relates to such a synthesis. It proposes to make an analog model corresponding to the velocity log of the well in which the velocity variations in the well are translated into velocity variations along the model. These velocity variations in the model are preferably obtained by temperature variations along the model. In most materials, the velocity of elastic waves is a function of the temperature. However, in view of the rapid variations which are required, we need a material which has a small heat conductivity and presents rather large velocity variations at relatively low temperatures, i.e., temperatures which are easily attained and controllable and which the material will withstand. We have found that plastics are generally proper (Nylon, Plexiglass, Lucite). Furthermore, we discovered that Nylon has a practically linear variation of velocity with temperature within a broad temperature and velocity range, as indicated in FIGURE 2, wherein the line 46, which was derived from plotted points 47, represents the variation in acoustic velocity characteristic corresponding to variation in the temperature of Nylon. Therefore, Nylon was most convenient for translating known velocity variations in the well into the corresponding desired temperature variations in the model.

Figure 3:
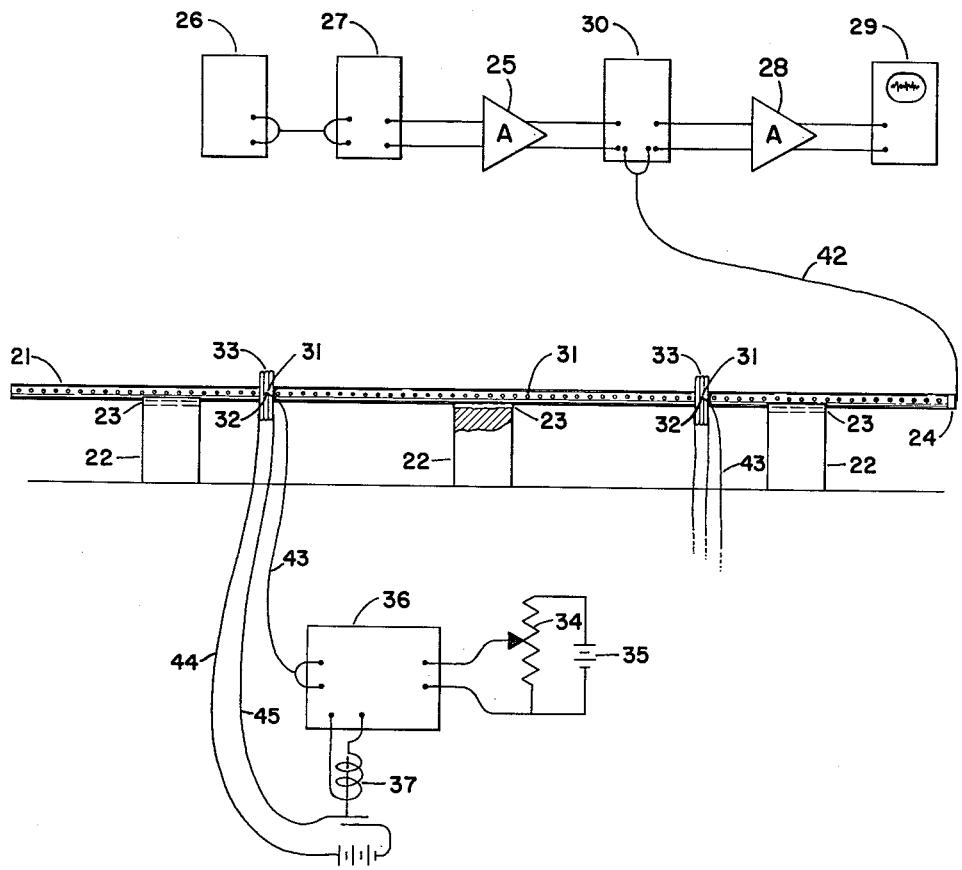
FIGURE 3 is a schematic representation shown partly in section of one embodiment of our invention.

The apparatus required to practice the invention is described with reference to FIGURE 3. A Nylon rod 21 is supported by convenient means such as wooden blocks 22, the friction between the rod and the blocks being minimized by a thin layer of cotton 23. Other convenient modes of suspension consist of wires hanging from the ceiling or stretched transversally under the rod.

At one end of the rod is glued an electro-mechanical transducer 24 which may preferably be of the piezoelectric or magnetostrictive type and which performs both functions of transmitting a seismic disturbance (shot) and detecting the reflected signals.

The transducer is energized by the output of an amplifier 25 which is controlled by the product of an oscillator 26 pulse shaper 27 combination by means of which pulses of desired shape and frequency may be produced. The transducer is also connected to a receiving system comprising an amplifier 28 and an oscilloscope 29.

The connection between transducer 24 and amplifier 25 or 28 is controlled by a gate 30 which is connected to the transducer by conductor 42 which operates as a relay disconnecting the receiver when the transmitter is connected and vice versa. This control is conveniently performed electronically in view of the rapidity and ease of switching that it provides. The gate also connects the output of the transmitting system to the sweep trigger of the oscilloscope, so that the detected reflected signal (seismic trace) appears on the face of the tube and the blast time is indicated by the beginning of the trace itself.

The velocity variations in the rod are obtained by temperature control along the rod. This may be achieved as follows: Hair-thin holes 31 are drilled transversely through the center of the rod in longitudinally spaced relation, and thermocouples 32 which are connected to a voltage comparator 36 through a conductor 43 are inserted therein. The output of these thermocouples is indicative of the temperature of the rod at these points. Although we have shown only two thermocouples 32, several are used, as will appear. A heating element 33, preferably in the form of a coil surrounding the rod, is positioned opposite each thermocouple and is controlled through conductors 44 and 45 by the result of the comparison of the output of the respective thermocouple 32 with the voltage corresponding to the desired temperature at this point. As long as the voltage is lower, the respective heating element is energized; but when the output of the thermocouple reaches the desired value, the respective heater is disconnected. This is easily accomplished by comparing the voltage output of each thermocouple 32 to an adjustable voltage produced by a potentiometer 34 and a battery 35. This comparison is performed by voltage comparator 36, whose output controls the energy supplied to the respective heating element 33 through relay 37. The temperature is consequently controlled; and by using a large number of separate heating elements, with each heating element controlled by a separate thermocouple and control circuit, the desired temperature profile and thereby the desired velocity profile (velocity log) may be achieved. We have found that the thermal conductivity of Nylon is small enough to allow the production of steep velocity gradients, and thus most velocity logs may be duplicated.

When practicing the invention, attention must be directed to the scaling ratio between the analog model and the well. The frequency of the transmitted pulse should be governed by the ratio of the velocities in the Nylon rod and in the well and the ratio of the linear dimensions of the rod and the well so that the ratio of the layer thickness to wavelength is the same in the model and in actual seismic prospecting. In other words, the ratio velocity-gradient/frequency should be the same in both model and well.

Figure 4:
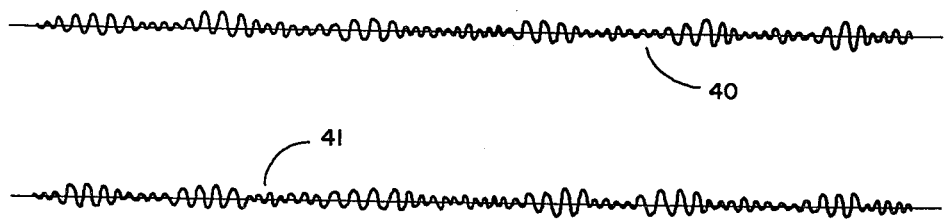
FIGURE 4 is an illustration of the type of synthetic trace which may be obtained by means of the apparatus described in FIGURE 3.

FIGURE 4 illustrates a synthetic seismic signal 40, which we produced by means of apparatus built in accordance with our invention. This synthetic trace displayed similarities with the corresponding field record as represented by trace 41.

The synthesis of such traces has been found particularly useful in the detailed interpretation of seismic field records.

From the foregoing explanation of the principle of the invention, it will be understood that further variations in embodiment may be made within the scope of the appended claims; and that in accordance with the principle of the present invention, a powerful tool has been provided by means of which a better and more detailed interpretation of field seismograms may be derived.

What we claim is:

1. Apparatus for producing a synthetic seismic signal corresponding to a known well velocity log, comprising an elongated plastic member, heating means surrounding discrete lengths of said plastic member, said heating means adapted to heat the plastic member to different temperatures simultaneously along the length thereof said different temperatures having known relations to the velocity variations of said log, means in operative association with said plastic member for applying an elastic pulse to one end thereof, and means for detecting the elastic pulses reflected to said one end.

2. Apparatus as defined in claim 1 characterized further in that said elongated plastic member is made of Nylon.

3. An apparatus for producing a synthetic seismic signal corresponding to a well-known velocity log comprising an elongated and homogeneous plastic member having a substantially uniform cross-section throughout the length thereof, signal generating means in contactual relationship with an end of said plastic member for applying an elastic pulse to said member, a detecting means in contactual relation with an end of said plastic member for receiving reflected signals from said member, and a heating means surrounding a discrete portion of the length of said member whereby a signal applied to the end of said member in contactual relationship with said signal generating means will have a variation in its velocity of propagation through said member when said member has been heated at said discrete portion.

4. An apparatus as defined in claim 3 characterized further in that said plastic member is made of Nylon.

5. An apparatus as defined in claim 3 and particularized in that said signal generating means and said detecting means comprise a single transducer capable of both transmitting and receiving said transmitted signal.

6. Apparatus as defined in claim 1 characterized further in that said means for heating the plastic member comprises a plurality of heating elements surrounding the plastic member in end-to-end spaced relation, and temperature sensitive elements in close proximity to said heating elements, each of said heat sensitive elements having a temperature controlling means including an input and an output, said temperature sensitive means connected to said input, and said output connected to said heating elements.

7. Apparatus as defined in claim 6 characterized further in that said means for individually controlling the amount of heat supplied to the plastic member by each heating element comprises a thermocouple having its junction substantially on the axis of said plastic member opposite the respective heating element.

8. Apparatus as defined in claim 3 characterized further in that said means for applying an elastic pulse to one end of said plastic member includes means for controlling the shape of said pulse.

9. Apparatus as defined in claim 3 characterized further in that said signal generating means for applying an elastic pulse to one end of said plastic member includes and electrical-mechanical transducer in contactual relationship with said end of said plastic member, a pulse shaper electrically connected to said transducer and a variable frequency oscillator electrically connected to said pulse shaper.

10. The method of producing a synthetic seismic signal corresponding to a known well velocity log, which comrpises the steps of establishing a temperature profile along an elongated plastic member having a predetermined relationship to the velocity profile along said log, applying an elastic pulse to said elongated plastic member at one extremity thereof, and detecting the elastic pulses reflected to said extremity.

References Cited in the file of this patent

UNITED STATES PATENTS

| 2,364,209 | Green | Dec. 5, 1944 |
| 2,697,936 | Farrow | Dec. 28, 1954 |
| 2,778,002 | Howry | Jan. 15, 1957 |
| 2,780,795 | Ambrosio | Feb. 5, 1957 |
| 2,834,442 | Angona | May 13, 1958 |

OTHER REFERENCES

McSkimin: "A Method for Determining the Propagation Constants of Plastics at Ultrasonic Frequencies," The Journal of the Acoustical Society of America, vol. 23, No. 4, July 1951, pages 429–434.